United States Patent [19]

Roberts

[11] Patent Number: 5,792,711

[45] Date of Patent: Aug. 11, 1998

[54] ANTIWETTING COMPOSITION FOR FABRICS AND FIBROUS SUBSTRATES

[75] Inventor: Keith A. Roberts, St. Paul, Minn.

[73] Assignee: Porous Media Corporation, St. Paul, Minn.

[21] Appl. No.: 880,490

[22] Filed: Jun. 23, 1997

Related U.S. Application Data

[60] Provisional application No. 60/040,891 Mar. 18, 1997.

[51] Int. Cl.$^6$ ........................................ B32B 27/04
[52] U.S. Cl. ........................ 442/87; 442/88; 427/244; 55/524
[58] Field of Search ........................ 442/87, 88; 427/244, 427/245, 387, 393.4; 162/164.4; 55/524

[56] References Cited

U.S. PATENT DOCUMENTS

| | | |
|---|---|---|
| 3,536,779 | 10/1970 | Bedikian et al. ............... 442/87 X |
| 4,210,697 | 7/1980 | Adiletta . |
| 4,566,981 | 1/1986 | Howells . |
| 4,865,903 | 9/1989 | Adiletta . |
| 4,868,042 | 9/1989 | Adiletta . |
| 5,209,850 | 5/1993 | Abayasekara et al. . |
| 5,209,965 | 5/1993 | Caldwell ........................ 442/87 X |
| 5,258,458 | 11/1993 | Allewaert et al. . |
| 5,260,360 | 11/1993 | Mrozainski et al. . |
| 5,300,357 | 4/1994 | Gardiner . |
| 5,462,586 | 10/1995 | Sugiyama et al. ............... 55/524 X |
| 5,516,578 | 5/1996 | Coppens . |
| 5,536,304 | 7/1996 | Coppens et al. . |
| 5,603,999 | 2/1997 | Namura et al. . |

*Primary Examiner*—Daniel Zirker
*Attorney, Agent, or Firm*—Marshall & Melhorn

[57] ABSTRACT

The invention covers an antiwetting composition for imparting hydrophobic properties onto fabrics and fibrous substrates, as well as a method for producing a hydrophobic article. The composition of the present invention includes a dispersion of polymeric fluoroaliphatic ester and a silicone resin prepolymer in a water-based carrier. The polymeric fluoroaliphatic ester is included in the dispersion at about 0.12 to 0.5 percent solids by weight. The silicone resin prepolymer is generally a polysiloxane having silanol terminal groups. The silicone compound is added to the dispersion in a range of about 0.08 to about 0.34 percent solids by weight. The components are impregnated in a fiber substrate and subsequently cured to provide an article having improved hydrophobic properties over known antiwetting compositions.

36 Claims, No Drawings

5,792,711

ANTIWETTING COMPOSITION FOR FABRICS AND FIBROUS SUBSTRATES

BACKGROUND OF THE INVENTION

1. Field of the Invention

This application is claiming the benefit, under U.S.C. § 119(e), of the provisional application filed Mar. 18, 1997 under 35 U.S.C. § 111(b), which was granted a Ser. No. 60/040,891. The provisional application, 60/040,891, is hereby incorporated by reference.

This invention relates to an antiwetting composition for imparting hydrophobic properties onto fibrous substrates and fabrics, as well as a method for producing a hydrophobic article. More particularly, this invention relates to an antiwetting composition which is a dispersion of a polymeric fluoroaliphatic ester and a silicone resin prepolymer in a water-based carrier. The components are impregnated in a fibrous substrate and subsequently cured to provide an article having improved hydrophobic properties over known antiwetting compositions.

2. Summary of Related Art

Antiwetting compositions are applied onto fabrics or fibrous articles in order to impart hydrophobic properties to the article. The hydrophobic properties enable the use of the article for various purposes. For example, cloth filter media, having a controlled pore structure and treated with an antiwetting composition, is generally utilized in medical and industrial applications for the separation of specific liquids from either another liquid stream or a gas stream.

In the medical industry, hydrophobic filter media are utilized as barriers in ventilation devices or respirators in which the filter is placed between the patient utilizing ventilator equipment and the environment. Antiwetting filters are important in such application because moisture pick up by the barrier can create a significant pressure drop, or excessive flow resistance, which may impair an individual's ability to breathe. Moisture exhaled from the patient may also contaminate equipment without such a filter. Other applications include material for urinary bags or blood barriers in venting devices such as suction canisters.

The separation of oil from water or the removal of water from a vapor stream are also accomplished through the use of hydrophobic filter media. Additionally, fabrics or textiles may be treated with antiwetting compositions in the clothing industry for repelling moisture or wicking moisture away.

There are various antiwetting compositions utilized in the filter media and clothing industries. For example, silicones and polymeric siloxanes are often used to treat fibrous substrates to impart hydrophobic properties onto the substrate. Additionally, certain fluorochemicals, such as quanidines and alcohols, are utilized to provide hydrophobic coatings. While the noted compounds provide hydrophobic properties, it remains desirable to improve upon those properties particularly in medical filter media applications where wetting of the substrate may have a significant undesirable impact.

U.S. Pat. No. 4,210,697 discloses an antiwetting composition and process for forming a hydrophobic fibrous sheet in which a polymer, selected from either polytetrafluoroethylene or polytrifluorochloroethylene, is sinter bonded to a silicone resin and a fibrous substrate. A dispersion of the thermoplastic prepolymers is applied to the substrate and then cured at temperatures in excess of 525° F. for the polytetrafluoroethylene, and in excess of 625° F. for the polytrifluorochloroethylene. The resulting hydrophobic substrate is suitable for use in medical applications such as vent filter media. The performance of the antiwetting composition in medical filters is sufficient. However, improved antiwetting compositions which provide further advancement of the art are desirable.

An antiwicking composition which includes a fluorinated ethylene/propylene copolymer, a fluoroaliphatic ester, a liquid carrier, and dispersant is disclosed in U.S. Pat. No. 4,868,042. The composition is applied onto fabrics used in the manufacture of protective clothing. The copolymer is not suitable for use on filter media in medical venting applications.

U.S. Pat. No. 5,536,304 discloses a water and oil repellency imparting composition which includes a fluoroaliphatic radical-containing agent and a cyclic carboxylic anhydride-containing polysiloxane. The fluoroaliphatic radical-containing agent may include condensation polymers such as polyesters. The composition is provided in an organic solvent carrier with less than five weight percent water in order to prevent the ring opening of the cyclic anhydride. Ring opening of the cyclic anhydride adversely affects the repellent properties of the resulting article. The composition is polymerized in the solvent and applied onto the substrate as a thin film. The solvent is evaporated from the substrate at temperatures below 120° C.

Thus, the existing patents teach the separate use of silicones or fluorochemicals to impart hydrophobic properties onto a fibrous substrate. Additionally, combinations of specific silicone compounds and prepolymers have been used to create antiwetting compositions. However, the compositions disclosed in the art do not provide sufficient hydrophobic properties over an extended period of time, are not suitable for medical filter media applications, require elevated curing temperatures, or require the solution polymerization of the compounds in organic solvents prior to the application of the polymer onto a fibrous substrate.

It would be an advantage to provide an antiwetting composition, suitable for application onto a fibrous substrate, that enhances the hydrophobic properties of the substrate. Enhanced hydrophobic properties would extend the useful life of substrates utilized as filter media.

It would also be an advantage to provide a process for applying an antiwetting composition to a fibrous substrate that utilizes a water-based carrier and low curing temperatures. A water-based carrier reduces environmental concerns associated with organic solvents and their subsequent removal from the substrate upon drying. Low curing temperatures enable the use of specific fibrous materials that would generally degrade at elevated curing temperatures.

SUMMARY OF THE INVENTION

In accordance with the present invention, there is provided a novel antiwetting composition for imparting hydrophobic properties onto a fibrous substrate. The present invention also includes a novel method for forming an antiwetting fibrous substrate and a novel article produced therefrom.

The composition of the present invention includes a dispersion of a polymeric fluoroaliphatic ester and a silicone resin prepolymer in a water-based carrier. The fluoroaliphatic ester is included in the dispersion at about 0.12 to about 0.5 percent solids by weight. The silicone resin prepolymer is generally a polysiloxane having silanol terminal groups. The silicone compound is added to the dispersion in a range of about 0.08 to about 0.34 percent solids by weight. A catalyst may optionally be added to the dispersion, at range of about 0.011 to about 0.046 percent solids by weight, to facilitate polymerization of the reactive components.

The dispersion of the present invention is utilized with a fibrous substrate to create an antiwetting article. The method of forming the substrate includes impregnating the substrate with the dispersion. The reactive components of the dispersion are subsequently polymerized by heating the substrate to form a hydrophobic article. The dispersion may be applied to a finished substrate or the substrate may be formed directly from a slurry containing the dispersion of reaction components and the fibrous material. Relatively low curing temperatures below 300° F. enable the use of various synthetic and natural fibers. For example, a non-woven sheet of glass fibers with a controlled pore structure may be utilized to form a fibrous filter media suitable for use as in industrial or medical filter systems.

It is an object of the present invention to provide an antiwetting composition that may be applied to a fibrous substrate to enhance the hydrophobic properties of the article. The present inventive composition provides improved and superior hydrophobic properties over conventional antiwetting compositions.

It is also an object of the present invention to provide a method for forming an antiwetting fibrous substrate that utilizes a water-based carrier and low curing temperatures. The present inventive process utilizes a fibrous substrate impregnated with the novel dispersion in a water-based carrier. The impregnated substrate is heated in order to cure the polymers. The low temperature at which the polymers are cured enables the use of various natural and synthetic fibers.

DETAILED DESCRIPTION OF THE PREFERRED EMBODIMENT

In accordance with the method of the present invention, it has been discovered that the combined use of a polymeric fluoroaliphatic ester and a silicone resin prepolymer in a water-based dispersion provide improved and superior hydrophobic properties when cured in a fibrous substrate. Additionally, the present invention encompasses the novel method for forming the substrate at relatively low curing temperatures. The finished article, with antiwetting properties, is suitable for use as filter media in industrial and medical applications. The antiwetting compositions may also be applied to textiles and textile fabrics to impart hydrophobic properties to those articles.

In accordance with the present invention, the polymeric fluoroaliphatic ester and the silicone resin prepolymer are provided as particles in a water-based or latex solution. The components of the composition are deposited onto the surface of fibers in a fibrous substrate where they are subsequently polymerized. Thus, coatings, in the context of the present invention, is used to indicate coatings on the surface of the fibers which make up the substrates, not merely a coating over the substrate.

The polymeric fluoroaliphatic ester is generally provided separately as a latex dispersion prior to admixing with the silicone compound. All polymeric fluoroaliphatic esters are suitable for with the present invention. For example, the fluoroaliphatic ester may include anionic, cationic, or non-ionic compounds. The preferred composition is a cationic polymeric fluoroaliphatic ester in a latex dispersion provided by the 3M Company of St. Paul, Minn. and marketed as FC824. The polymeric fluoroaliphatic ester is included in the dispersion at about 0.12 to about 0.5 percent solids by weight, and preferably at about 0.2 to about 0.3 percent solids by weight.

The antiwetting composition of the present invention includes a silicone resin prepolymer which is generally a polysiloxane in a partial, or incomplete stage of polymerization. The functional terminal group of the polysiloxane is the silanol terminal group. The polysiloxane compound is selected from the group consisting of polydimethyl siloxane, polymethylethyl siloxane, polydiethyl siloxane, polydihexyl siloxane, polydiphenyl siloxane, polyphenylmethyl siloxane, polydipropyl siloxane, polydicyclohexyl siloxane, polydicyclopentyl siloxane, polymethylcyclopentyl siloxane, polydicyclobutyl siloxane, polymethylcyclohexyl siloxane, and polydicycloheptyl siloxane. The silicone resin prepolymer is included in the dispersion at about 0.08 to about 0.34 percent solids by weight. The preferred composition range is about 0.12 to about 0.2 percent solids by weight. In accordance with the present invention, the preferred compound is dimethyl polysiloxane in an aqueous water-based emulsion provided by GE Silicones of Waterford, N.Y. and marketed as SM2138.

The composition of the present invention may optionally include a catalyst which assists in the polymerization of the silicone resin prepolymer. All conventional catalyst capable of initiating the polycondensation of silanol groups in the silicone compounds are suitable for use with the present invention. The catalyst is generally included in the composition at about 0.011 to about 0.046 percent solids by weight. Preferably, the catalyst included in the composition is about 0.02 to about 0.03 percent solids by weight. A specific catalyst for use with the preferred dimethyl polysiloxane is a catalyst emulsion marketed by GE Silicones and designated as SM2104C.

The substrates utilized in accordance with the inventive composition may include both hydrophobic and hydrophilic fibers. Therefore, with hydrophobic fibers, a wetting agent or emulsifier may optionally be included in the dispersion to improve the wetting of the substrate and thus the dispersion of the polymer components. Conventional wetting agents and emulsifiers are suitable for use in the dispersion.

The polymeric fluoroaliphatic ester and the silicone resin prepolymer are combined to form a water-based dispersion. The components should be mixed thoroughly to provide a uniform dispersion. With a cationic polymeric fluoroaliphatic ester and an anionic silicone prepolymer, vigorous agitation may result in the undesirable formation of a precipitate. Therefore, vigorous agitation should be avoided with those specific forms of components. Upon mixing, the resulting water-based dispersion is suitable for application onto fibrous substrates to form antiwetting articles.

The substrate from which the finished article is formed may include various fibrous materials. The fibers must be able to withstand temperatures of up to 300° F., which is the recommended curing temperature for the polymeric components of the dispersion. The fibrous materials may be woven or non-woven and in sheet form. The substrate may also consist of one or multiple layers of the same or different material.

In accordance with the present invention, the substrate materials may include, but are not limited to, compounds selected from the group consisting of mineral wool, glass, quartz, stainless steel, silica, titania, carbon oxides, boron oxides, polyester, nylon, polypropylene, textile fabrics, and textile fibers. The fibrous compounds have surfaces capable of receiving a hydrophobic coating. The preferred substrate is a non-woven sheet of glass fibers having a controlled pore structure. The preferred substrate is ideally suited for producing filter media.

The method of the present invention generally involves the application of the dispersion onto a fibrous substrate. The polymer components of the dispersion are impregnated into the substrate. The substrate is then heated in order to cure the polymer components and form a hydrophobic coating on the fiber surfaces of the substrate.

The fibrous substrate may be impregnated with the dispersion by several means. The substrate may be saturated with the dispersion in order to provide thorough distribution of the polymer components throughout the substrate. All conventional techniques for applying a dispersion onto a substrate are suitable for us with the present inventive process. For example, with a preformed substrate, the dispersion may be sprayed onto the substrate. Additionally, the dispersion may be applied by dipping or conveying the substrate through a bath containing the dispersion. The substrate may then be conveyed through rollers in order to compress the substrate and remove excess water while leaving the polymers dispersed throughout the substrate.

An alternative means of impregnating the fibrous substrate includes the formation of a slurry with the dispersion and the desired fibers. The substrate is then formed directly from the slurry with the polymer compounds dispersed in the substrate. This technique can result in an improved and more uniform application of the polymeric fluoroaliphatic ester and silicone prepolymer in the substrate.

Depending upon the form utilized for impregnating the substrate, it may become necessary to first dry the substrate to remove water. The drying generally takes place at a temperature of about 110° F. to about 250° F.

In accordance with the method of the present invention, the polymeric fluoroaliphatic ester and the silicone resin prepolymer are cured by applying heat to the fibrous substrate. The substrate is heated to a temperature range between about 250° F. to about 300° F. in order to completely polymerize the compounds. The substrate remains within the temperature range for up to 15 minutes until the polymerization of the compounds and the forming of a hydrophobic coating upon the fibers surfaces in the substrate is completed. After polymerization, the substrate is then cooled to ambient temperature and further processed for the desired final application.

The resulting article has improved hydrophobic properties over known antiwetting compositions. The article exhibits an improved resistance to wetting under humid air conditions and resists saturation over an extended period of time. Thus, the antiwetting composition is suitable for use in industrial and medical filter applications. Additionally, the composition may be used to treat textiles or fabrics to impart moisture repelling or moisture wicking properties.

The following examples, which constitute the best mode presently contemplated by the inventor for practicing the present invention, are presented solely for the purpose of further illustrating and disclosing the present invention, and are not to be construed as a limitation on the invention:

EXAMPLES 1-10

A series of examples were produced to demonstrate the hydrophobic properties of the invention. The examples include both comparative examples and examples produced from the composition of the present invention. Non-woven sheets of glass fibers, having comparable controlled pore structures, were impregnated with various aqueous suspensions capable of imparting hydrophobic properties in fibrous or textile media. The Examples were prepared in accordance with the processing steps required of the particular hydrophobic compositions. Table I lists the Examples and the aqueous suspension/emulsion used to impregnate the fibrous substrate. Table II is a comparison of the controlled pore structures, and corresponding pore sizes, for Examples 1,5, and 10. The pore size for each respective Example was measured using a Coulter Porometer. Table III illustrates the results of a water column test which measures the applied pressure and time elapsed before water passes through the substrate. Table IV reports the results of a Humidity test which subjects each Example to humid conditions over an extended period of time. In the Humidity test, the pressure drop is monitored for each Example until the media becomes saturated.

TABLE I

| Example 1  | unimpregnated media |
| Example 2  | media impregnated with aqueous silicone |
| Example 3  | media impregnated with aqueous silicone and catalyst |
| Example 4  | media impregnated with polymeric fluoroaliphatic ester (PFE) |
| Example 5  | media impregnated in accordance with the present invention (PFE, dimethyl polysiloxane, and catalyst) |
| Example 6  | media impregnated with PFE and catalyst |
| Example 7  | media impregnated with PFE and silicone |
| Example 8  | media impregnated in accordance with the present invention (produced on-line in a large scale automatic process) |
| Example 9  | media impregnated in accordance with the present invention (produced on-line in a large scale automatic process) |
| Example 10 | media coated with poytetrafluoroethylene and silicone polymer in accordance with U.S. Pat. No. 4,210,697 |

TABLE II

|  | Example 1 | Example 5 | Example 10 |
| --- | --- | --- | --- |
| No. of Samples Measured | 3 | 1 | 2 |
| Min. Pore Size Microns | 2.62 +/− 0.23 | 2.9 | 3.43 +/− 0.10 |
| Max. Pore Size Microns | 7.10 +/− 0.27 | 7.03 | 8.87 +/− 0.38 |
| Mean Flow Pore Size Microns | 3.99 +/− 0.21 | 4.13 | 5.32 +/− 0.20 |

Preparation of Example 5

In accordance with the present invention, a first mixture containing a polymeric fluoroaliphatic ester (PFE) and a catalyst was produced. The mixture was made by thoroughly mixing 1000 ml of deionized water with 5 ml of a PFE, designated as FC-824 and marketed by the 3M Company of St. Paul, Minn., and 1 ml of a catalyst, designated as SM2104C and marketed by GE Silicones of Waterford, N.Y.

A second mixture, containing a silicone resin prepolymer, was produced by mixing 10 ml of a dimethyl polysiloxane, designated as SM2138 and marketed by GE Silicones of Waterford, N.Y., with 1000 ml of deionized water. The two mixtures were then combined and thoroughly mixed to form 2016 ml of the antiwetting dispersion of the present invention.

A non-woven glass fiber substrate, having a controlled pore structure with a mean pore size of 4.13, was utilized as the substrate for the present example. The substrate was impregnated with the dispersion by spraying the composition over the substrate until the substrate was saturated. The substrate was then dried at 190° F. to remove excess water.

The polymer components dispersed throughout the substrate were subsequently cured by heating the substrate to 275° F. for approximately 10–15 minutes. The media was then cooled and then subjected to a water column test and a humidity test to determine hydrophobic properties.

Preparation of Examples 8 and 9

A 100 gallon dispersion containing the polymer reaction components of the present invention was produced with a similar concentration and in a similar manner to that used in Example 5. The dispersion was placed in a bath on an automatic substrate coating line. A previously formed glass fiber substrate, wound on a bale or roll, was placed at the feed end of the process. The glass filter media was then unwound and fed through the bath at a rate of about 40 feet per minute. The substrate was completely submersed in the bath in order to saturate the substrate with the dispersion. A wire mesh conveyor then carried the saturated substrate through an oven, maintained a temperature of 300° F., in order to cure the polymer components impregnated in the substrate. The finished filter media was then wound onto a roll. Example 8 was taken from the beginning portion of the roll whereas Example 9 was taken from the end of the roll.

Results of the Water Column Test

The following procedure was utilized for the water column test. The Examples were cut into 2 inch diameter disks and placed into the test column. The water column apparatus was filled with water to a level of approximately one quarter inch below the level of the test media. A stop watch was then started as pressure was introduced to the system by adjusting a regulator. The regulator was adjusted slowly in an attempt to maintain an approximate increase in pressure of twelve inches of water per minute. As the pressure was increased the surface of the media was observed. At the first sign of water droplets forming on the media surface, the time and system pressure was recorded. This procedure was repeated for each Example.

The results of the water column tests are reported in Table III. Examples 5,8, and 9 produced in accordance with the present inventive composition and process showed improved results over the other examples utilized in the test. Examples 8 and 9 particularly showed improved repellency as indicated by the time required before water penetrated the substrate.

TABLE III

| Example | Average | Water Column Press (inches H$_2$O) | Time (Sec) |
|---|---|---|---|
| Example 1 | | 1 | 0 |
| Example 1 | | 2 | 0 |
| | average | 1.5 | 0 |
| Example 2 | | 53 | 176 |
| | average | 53 | 176 |

TABLE III-continued

| Example | Average | Water Column Press (inches H$_2$O) | Time (Sec) |
|---|---|---|---|
| Example 3 | | 29 | 153 |
| Example 3 | | 22 | 116 |
| | average | 25.5 | 134.5 |
| Example 4 | | 10 | 20 |
| | average | 10 | 20 |
| Example 5 | | 71 | 256 |
| Example 5 | | 68 | 201 |
| | average | 69.5 | 228.5 |
| Example 6 | | 23 | x |
| Example 6 | | 21 | 166 |
| | average | 22 | x |
| Example 7 | | 24 | 110 |
| Example 7 | | 31 | 151 |
| | average | 27.5 | 130.5 |
| Example 8 | | 69 | 229 |
| Example 8 | | 69 | 299 |
| | average | 69 | 264 |
| Example 9 | | 73 | 289 |
| Example 9 | | 76 | 288 |
| | average | 74.5 | 288.5 |
| Example 10 | | 67 | 246 |
| Example 10 | | 71 | 207 |
| | average | 69 | 226.5 |

Results of the Humidity Test

The following procedure was utilized for the Humidity test. The test was utilized to simulate a human respiratory environment where a patient's exhalation breath is typically saturated to 100% relative humidity and 35° C. The test was conducted through the use of a STAR® Laboratories Differential Pressure Test Apparatus. Each of the Examples was divided into a 3 inch square strip and inserted into the testing apparatus. The Examples were subjected to a 10 slpm air flow stream at 37° C. and 100% relative humidity. The differential pressure across the media was measured in units of inches of water column. Media which resists wetting shows a gradual increase in differential pressure as a function of time. The differential pressure of each of the Examples was measured over time until the media was wetted.

The results of the test are illustrated in Table IV. The Examples of the present invention showed superior resistance to moisture over the comparative Examples. All of the Examples, with the exception of the media prepared in accordance with the present invention, absorbed enough moisture that the test equipment was unable to measure a pressure drop across the media. The wetting of the substrates occurred within 48 hours which is the desired duration limit for use in expiratory filtration applications. Only the examples prepared in accordance with the present invention extended beyond the 46 hour mark.

TABLE IV

| Time | Differential Pressure (Inches of Water Column) Examples | | | | | | | | | |
|---|---|---|---|---|---|---|---|---|---|---|
| Hours | 1 | 2 | 3 | 4 | 5 | 6 | 7 | 8 | 9 | 10 |
| 0 | 0.53 | 0.52 | 0.44 | 0.52 | 0.48 | 0.49 | 0.53 | 0.5 | 0.49 | 0.37 |
| 1 | na | 0.62 | na | 0.59 | 0.59 | na | na | 0.59 | 0.55 | na |
| 1.5 | 0.64 | na | na | na | na | 0.56 | 0.58 | na | na | na |
| 2 | 0.66 | 0.67 | na | 0.66 | 0.65 | 0.56 | 0.57 | 0.65 | 0.57 | na |
| 3 | 0.79 | 0.71 | 0.77 | 0.73 | 0.7 | 0.6 | 0.61 | 0.68 | 0.6 | 0.58 |
| 4 | 1.02 | 0.79 | 0.89 | 0.88 | 0.75 | 0.64 | 0.64 | 0.73 | 0.64 | 0.62 |
| 8 | 2.83 | 1.2 | 4.4 | 2.33 | 0.9 | 1.23 | 0.78 | 0.89 | 0.81 | 0.92 |
| 17 | na | na | na | na | 1.2 | na | na | na | na | na |
| 19 | na | na | na | na | 1.1 | na | na | na | na | na |
| 20.5 | na | na | na | na | na | na | na | na | na | 1.63 |
| 22 | na | na | na | na | 1.25 | na | na | na | na | na |
| 23 | na | na | na | na | 1.28 | na | na | na | na | na |
| 24 | wetted | wetted | wetted | wetted | na | wetted | wetted | 1.23 | 1.15 | 1.7 |
| 27 | na | na | na | na | 1.25 | na | na | na | na | na |
| 28 | na | na | na | na | na | na | na | 1.23 | 1.17 | na |
| 28.5 | na | na | na | na | na | na | na | na | na | 1.9 |
| 30.5 | na | na | na | na | na | na | na | 1.25 | 1.17 | na |
| 32 | na | na | na | na | na | na | na | na | na | 2.15 |
| 40.5 | na | na | na | na | 1.28 | na | na | 1.33 | 1.25 | na |
| 43 | na | na | na | na | 1.3 | na | na | na | na | na |
| 46 | na | na | na | na | na | na | na | na | na | wetted |
| 47.5 | na | na | na | na | 1.3 | na | na | <1.5 | <1.5 | na |
| 51 | na | na | na | na | 1.33 | na | na | na | na | na |
| 65 | na | na | na | na | 1.35 | na | na | na | na | na |

In accordance with the provisions of the patent statutes, the present invention has been described in what is considered to represent its preferred embodiment. However, it should be noted that the invention can be practiced otherwise than as specifically illustrated and described without departing from its spirit and scope.

What is claimed is:

1. A curable antiwetting composition, comprising a dispersion of a polymeric fluoroaliphatic ester and a silicone resin prepolymer in a water-based carrier suitable for providing hydrophobicity to fibrous substrates when applied thereto, and heat-cured thereafter.

2. An antiwetting composition as recited in claim 1, wherein said silicone resin prepolymer is a polysiloxane selected from the group consisting of polydimethyl siloxane, polymethylethyl siloxane, polydiethyl siloxane, polydihexyl siloxane, polydiphenyl siloxane, polyphenylmethyl siloxane, polydipropyl siloxane, polydicyclohexyl siloxane, polydicyclopentyl siloxane, polymethylcyclopentyl siloxane, polydicyclobutyl siloxane, polymethylcyclohexyl siloxane, and polydicycloheptyl siloxane.

3. An antiwetting composition as recited in claim 1, wherein said polymeric fluoroaliphatic ester is selected from the group consisting of anionic fluoroaliphatic esters, cationic fluoroaliphatic esters, and non-ionic fluoroaliphatic esters.

4. An antiwetting composition as recited in claim 1, wherein said silicone resin prepolymer has silanol terminal groups.

5. An antiwetting composition as recited in claim 1, wherein said composition includes a catalyst.

6. An antiwetting composition as recited in claim 5, wherein said catalyst is about 0.011 to about 0.046 percent solids by weight.

7. An antiwetting composition as recited in claim 1, wherein said polymeric fluoroaliphatic ester is about 0.12 to about 0.5 percent solids by weight.

8. An antiwetting composition as recited in claim 1, wherein said silicone resin prepolymer is about 0.08 to about 0.34 percent solids by weight.

9. A curable antiwetting composition, comprising a dispersion of a polymeric fluoroaliphatic ester at about 0.12 to about 0.5 percent solids by weight, and a polysiloxane, having silanol terminal groups, at about 0.08 to about 0.34 percent solids by weight, in a water-based carrier suitable for providing hydrophobicity to fibrous substrates when applied thereto, and heat-cured thereafter.

10. An antiwetting composition as recited in claim 9, wherein said dispersion includes a catalyst at about 0.011 to about 0.046 percent solids by weight.

11. A method for forming an antiwetting fibrous substrate, comprising heating a fibrous substrate impregnated with a curable, water-based composition including a polymeric fluoroaliphatic ester and a silicone resin prepolymer to cure the composition and thereby form a hydrophobic fibrous substrate.

12. A method as recited in claim 11, wherein said heating occurs at a temperature between 250° F. to 300° F.

13. A method as recited in claim 11, wherein said composition of polymeric fluoroaliphatic ester and silicone resin prepolymer are provided as a dispersion in a water-based carrier, said dispersion is applied to said fibrous substrate in order to impregnate said substrate with the composition.

14. A method as recited in claim 13, wherein said dispersion includes about 0.12 to about 0.5 percent solids by weight of the polymeric fluoroaliphatic ester and about 0.08 to about 0.34 percent solids by weight of the silicone resin prepolymer.

15. A method as recited in claim 14, wherein the dispersion includes a catalyst at about 0.011 to about 0.046 percent solids by weight.

16. A method as recited in claim 13, further comprising drying said impregnated fibrous substrate prior to curing in order to remove water.

17. A method as recited in claim 11, wherein said composition of polymeric fluoroaliphatic ester and silicone resin prepolymer are provided as a dispersion in a water-based carrier and combined with fibers to form a slurry, said fibrous substrate formed from said slurry with the composition thereby impregnated in said fibrous substrate.

18. A method as recited in claim 16, wherein said drying occurs a temperature between about 110° F. to about 250° F.

19. A method as recited in claim 11, wherein said silicone resin prepolymer is a polysiloxane having silanol terminal groups.

20. A method for forming an antiwetting fibrous substrate, comprising:
   (a) providing a dispersion containing a polymeric fluoroaliphatic ester and a silicone resin prepolymer in a water-based carrier;
   (b) impregnating a fibrous substrate with said dispersion; and
   (c) curing the polymeric fluoroaliphatic ester and silicone resin prepolymer by applying heat to said substrate so that a hydrophobic coating is formed on fibers throughout said substrate.

21. A method as recited in claim 20, further comprising drying the impregnated fibrous substrate prior to curing in order to remove water.

22. A method as recited in claim 21, wherein said drying occurs a temperature between about 110° F. to about 250° F.

23. A method as recited in claim 20, wherein said curing occurs at a temperature of about 250° F. to 300° F.

24. A method as recited in claim 20, wherein said silicone resin prepolymer is a polysiloxane selected from the group consisting of polydimethyl siloxane, polymethylethyl siloxane, polydiethyl siloxane, polydihexyl siloxane, polydiphenyl siloxane, polyphenylmethyl siloxane, polydipropyl siloxane, polydicyclohexyl siloxane, polydicyclopentyl siloxane, polymethylcyclopentyl siloxane, polydicyclobutyl siloxane, polymethylcyclohexyl siloxane, and polydicycloheptyl siloxane.

25. A method as recited in claim 20, wherein said dispersion includes about 0.12 to about 0.5 percent solids by weight of the polymeric fluoroaliphatic ester and about 0.08 to about 0.34 percent solids by weight of the silicone resin prepolymer.

26. A method as recited in claim 20, wherein the dispersion includes a catalyst at about 0.011 to about 0.046 percent solids by weight.

27. A method as recited in claim 20, wherein said substrate is impregnated by first forming a slurry of fibers in the dispersion and then forming said substrate from the slurry.

28. A method as recited in claim 20, wherein said substrate is impregnated by applying the dispersion onto a preformed fibrous substrate.

29. A method as recited in claim 28, wherein the dispersion is applied by dipping the substrate into a bath or by spraying the dispersion onto the substrate.

30. A method as recited in claim 20, wherein said fibrous substrate includes at least one fibrous compound selected from the group consisting of mineral wool, glass, quartz, stainless steel, silica, titania, carbon oxides, boron oxides, polyester, nylon, polypropylene, textile fabrics, and textile fibers, the fibrous compounds having surfaces capable of receiving a hydrophobic coating.

31. A method as recited in claim 20, wherein said fibrous substrate is a non-woven sheet of glass fibers having a controlled pore structure.

32. An antiwetting article comprising: a fibrous substrate, and an antiwetting composition derived from a composition comprising a water-based carrier, a polymeric fluoroaliphatic ester and a silicone polymer having silanol terminal groups heat cured thereon.

33. An antiwetting article as recited in claim 32, wherein said silicone polymer is a polysiloxane.

34. An antiwetting article as recited in claim 32, wherein said substrate includes at least one fibrous compound selected from the group consisting of mineral wool, glass, quartz, stainless steel, silica, titania, carbon oxides, boron oxides, polyester, nylon, polypropylene, textile fabrics, and textile fibers, the fibrous compounds may be woven or non-woven, and have surfaces capable of receiving a hydrophobic coating.

35. An antiwetting article as recited in claim 32, wherein said fibrous substrate is a non-woven sheet of glass fibers having a controlled pore structure.

36. An antiwetting article produced by the process of claim 11.

* * * * *